United States Patent [19]
Wright

[11] 3,936,709
[45] Feb. 3, 1976

[54] CONTROL CIRCUITS FOR ELECTRICALLY DRIVEN VEHICLES

[75] Inventor: Maurice James Wright, Birmingham, England

[73] Assignee: Joseph Lucas (Industries) Limited, Birmingham, England

[22] Filed: June 14, 1974

[21] Appl. No.: 479,533

[30] Foreign Application Priority Data
June 30, 1973 United Kingdom............... 31301/73

[52] U.S. Cl. ................ 318/269; 318/139; 318/341; 318/345; 318/373
[51] Int. Cl.² .......................................... H02P 3/00
[58] Field of Search ............ 318/269, 139, 341, 345, 318/373, 258

[56] References Cited
UNITED STATES PATENTS
3,344,328  9/1967  Morris ................................. 318/373
3,777,237  12/1973  Anderson............................ 318/345

*Primary Examiner*—G. Z. Rubinson
*Attorney, Agent, or Firm*—Holman & Stern

[57] ABSTRACT

In a control circuit for an electrically driven vehicle, there is a thyristor chopper circuit which sets the current flow in a traction motor to a demanded level. The motor is capable of driving the vehicle forwardly or in reverse, and is also capable of effecting electrical braking. Whenever the motor is switched from its forward drive to its forward braking condition, or vice versa, the demand signal is set at a low level for a predetermined period.

2 Claims, 7 Drawing Figures

CONTROL CIRCUITS FOR ELECTRICALLY DRIVEN VEHICLES

A control circuit according to the invention comprises in combination a traction motor for driving the vehicle, an accelerator pedal which when depressed provides electrical drive and also determines the current in the motor armature, a brake pedal which when depressed provides electrical braking and also determines the current in the motor armature, a thyristor chopper circuit controlling the operation of the motor, said chopper circuit including a main thyristor in series with the motor, a commutating capacitor for turning the main thyristor off, and a commutating thyristor controlling the commutating capacitor, a control unit which receives a signal representing the actual armature current and a signal from one of said pedals representing demanded armature current, the control unit providing gating pulses to the thyristors, in sequence in accordance with the actual and demanded current signals so as to control the armature current, and control means operable whenever the motor is switched from its forward drive to its forward braking condition and vice versa for reducing the demand signal fed to said control unit to a low level for a set period so that the thyristors are fired in the correct sequence.

Preferably, the control means reduces the demand signal to zero for the set period and then permits the demand signal to rise gradually to the level set by the accelerator or brake pedal.

Figure 1:
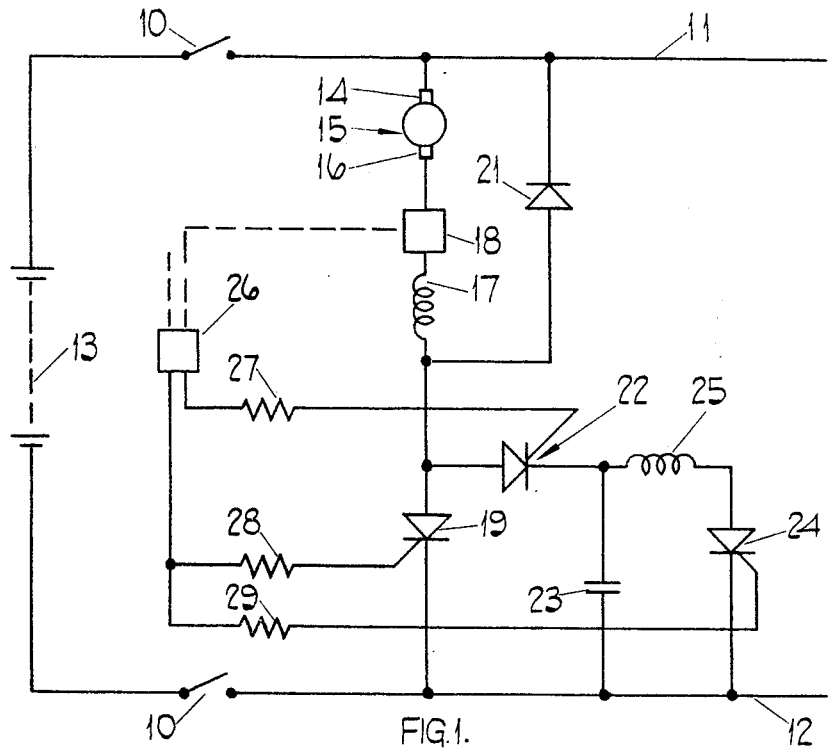
Figure 2:
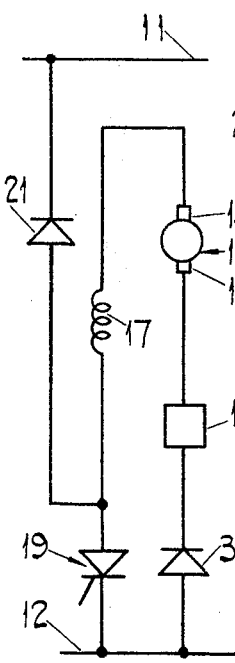
Figures 3, 4:
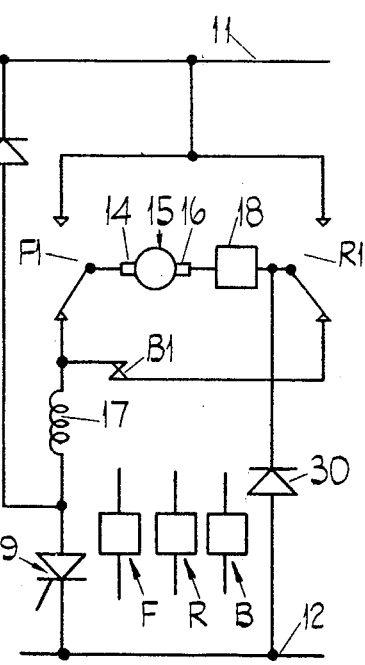
Figure 5:
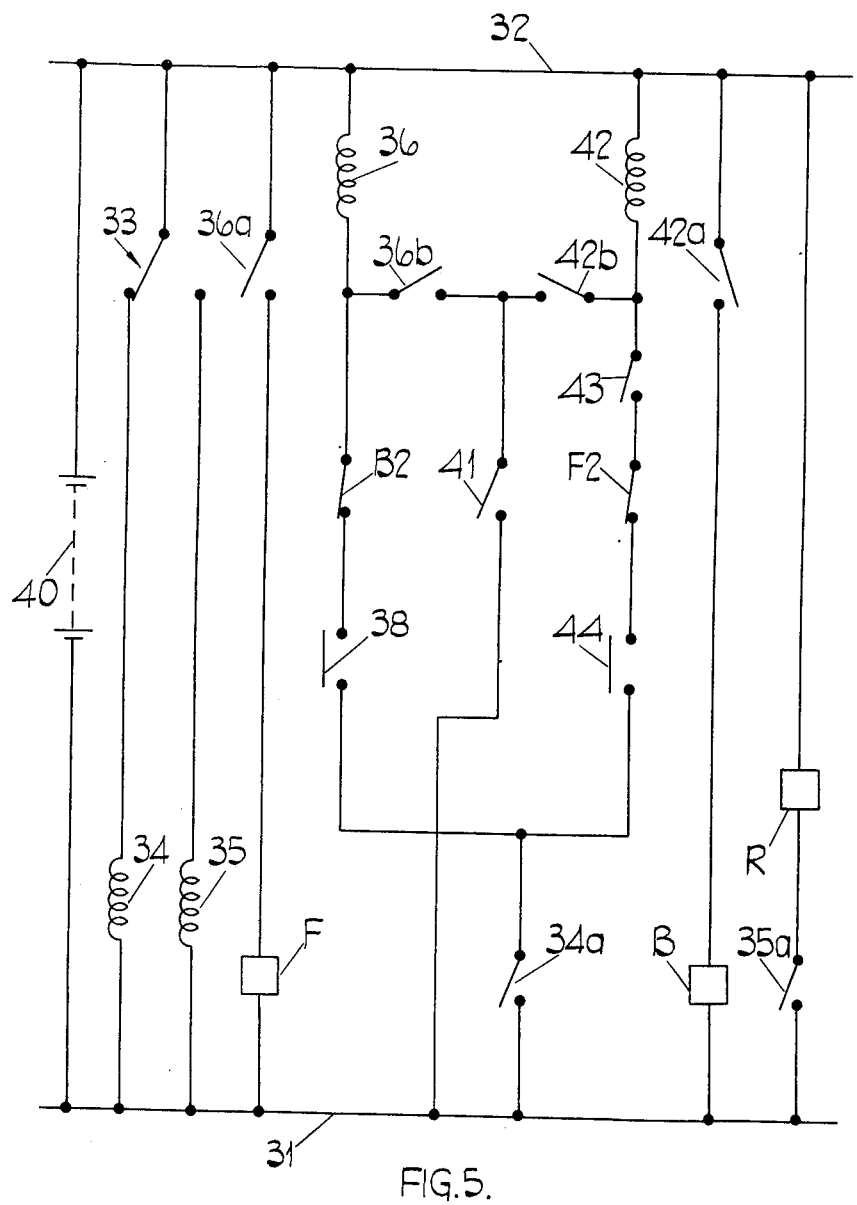
Figure 6:
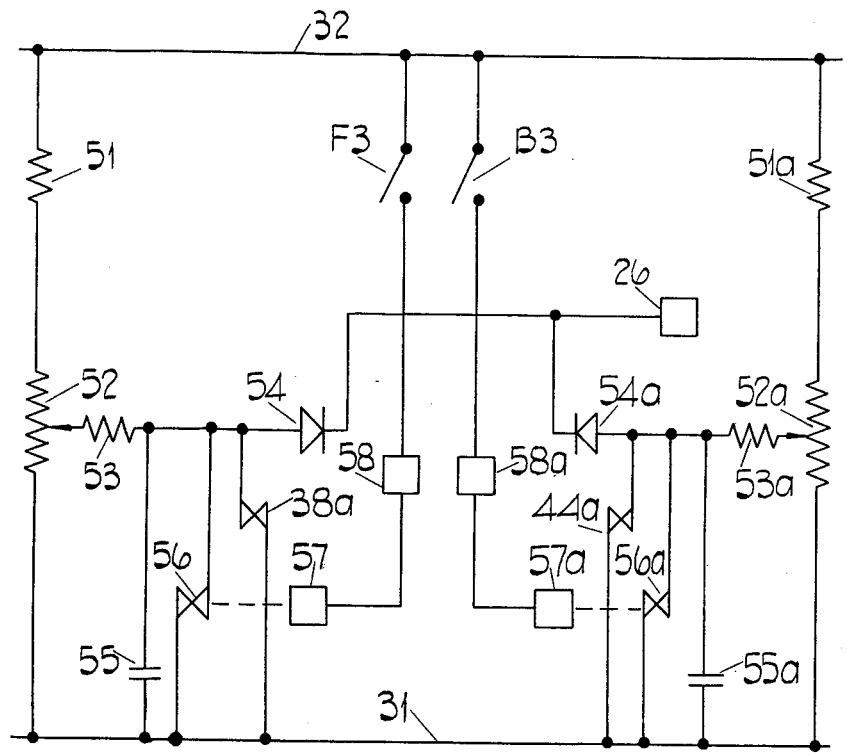

Two examples of the invention are illustrated in the accompanying drawings, in which FIGS. 1 to 3 are circuit diagrams of a control circuit for an electrically driven vehicle showing three alternative connections of the circuit, FIG. 4 illustrates an arrangement of contactors for producing the connections seen in FIGS. 1 to 3, FIGS. 5 and 6 are circuit diagrams of a control arrangement use in FIGS. 1 to 4, and FIG. 7 is a circuit diagram illustrating a modification of FIG. 6.

Referring first to FIG. 1, there are provided positive and negative supply lines 11, 12 connected to the traction battery 13 of the vehicle through contacts 10. Typically, the battery 13 has a voltage in excess of 200 volts. Connected to the line 11 is one end 14 of the armature of a series wound traction motor 15, the other end 16 of the armature being connected to the line 12 through a series circuit including a current sensing device 18, the field winding 17 of the motor 15 and the anode-cathode path of a thyristor 19. Sensing device 18 is more fully described in U.S. Pat. No. 3,841,238, issued Oct. 15, 1974. The series combination of armature, device 18 and winding 17 is bridged by a freewheel diode 21, and the junction of the winding 17 and thyristor 19 is connected to the anode of a thyristor 22, the cathode of which is connected to the line 12 through a capacitor 23. The capacitor 23 is bridged by an inductor 25 and the anode-cathode path of a thyristor 24 in series. The thyristors 19 and 24 have their gates connected through resistors 28, 29 respectively to one output terminal of a control unit 26, the unit 26 having a second output terminal which is connected through a resistor 27 to the gate of the thyristor 22. Control unit 26 is more fully described in U.S. Pat. No. 3,841,238, issued Oct. 15, 1974.

FIG. 1 shows the circuit connections when the vehicle is being driven in a forward direction. The accelerator pedal of the vehicle operates a potentiometer which produces an output representing the demanded current level in the motor. This output signal is converted to two signals representing an upper current level and a lower current level respectively, and these two signals are sensed by the control unit 26, which also receives a signal from the device 18. When the current flow in the motor reaches the upper level, the thyristor 19 is turned off, and when the current flow falls to the lower level, the thyristor 19 is turned on again. The operation of the circuit to control the thyristor 19 is best explained by commencing at a point in the cycle of operations when the thyristors 19 and 24 are off, and the thyristor 22 is conducting and charging the capacitor 23. When the capacitor 23 is charged, current flow through the thyristor 22 reduces to zero and so the thyristor 22 turns off. Since the thyristor 19 is not conducting, the current flow in the device 18 will be decreasing, and when the current reaches the lower level, the unit 26 produces an output to turn on the thyristor 19 and the thyristor 24. Conduction of the thyristor 24 causes the charge on the capacitor 23 to be reversed, after which the thyristor 24 turns off. The capacitor 23 is now charged with its lower plate positive and its upper plate negative. Conduction of the thyristor 19 causes current to flow in the armature 15 and the winding 17, and the current flowing in the device 18 now increases until it reaches the upper level. When this upper level is reached, the control unit 26 produces an output to turn on the thyristor 22, permitting discharge of the capacitor 23 with the result that the thyristor 19 is turned off. The capacitor 23 now charges again through the thyristor 22 and the cycle is repeated.

In the arrangement being described, it is also possible to use the motor to brake the vehicle electrically, and to use the motor to drive the vehicle in reverse. FIG. 1 does not show the various contactor arrangements which are used for this purpose, but FIGS. 2 and 3 show the circuit connections when these contactors are in the appropriate position. Thus, FIG. 2 shows the arrangement when the vehicle is to be driven in reverse. The circuit connections are the same as in FIG. 1, except that the end 16 of the motor 15 is now connected to the line 11 through the device 18 and the other end 14 is connected to the winding 17. The operation is exactly the same as in FIG. 1, except that the motor is driven in the reverse direction.

FIG. 3 shows the circuit connections when the motor is being used to brake the vehicle electrically. The end 14 of the motor is connected to the winding 17 as in FIG. 2, but the end 16 is now connected to the line 12 through the device 18 and an additional diode 30 in series. When the motor is being used to brake the vehicle, the potentiometer operated by the accelerator pedal is inoperative, but another potentiometer is operated by the brake pedal, and provides a signal to the unit 26 in exactly the same way as the potentiometer operated by the accelerator pedal. Thus, the current in the motor armature will be controlled in the same way as described with reference to FIG. 1. In this case, however, the motor 15 acts as a generator and charges the battery by way of the diodes 21 and 30.

There are various contactor arrangements that can be used to produce the arrangements shown in FIGS. 1 to 3, but one possible arrangement is shown in FIG. 4. The basic controls of the vehicle are the accelerator pedal, which when depressed operates a potentiometer as previously explained, the brake pedal which operates another potentiometer and also provides normal hydraulic braking for the vehicle, and a selector switch which has a central off position but is movable in opposite directions from the off position to select forward or reverse movement of the vehicle. In FIG. 4 three contactor operating devices F, R, B are shown. If the selector switch is in the forward position and the accelerator pedal is depressed, the device F will be energised and will operate a contact F1 which normally occupies the position shown in the drawing but when the device F is energised moves to its alternative position in which it connects the circuit in the manner indicated in FIG. 1. If, on the other hand, the selector switch is moved to its reverse position and the accelerator pedal is depressed, then the device R is energised and a contact R1 is moved from the position shown to its alternative position, at which point the circuit is in the form indicated in FIG. 2.

If the selector switch is in its forward position, but the brake pedal is depressed, then normal hydraulic braking is provided, but in addition the device B is energised to open the contact B1. The contacts F1 and R1 will be in the positions shown, and so it will be seen that the circuit now has the form shown in FIG. 3, so that electrical braking is provided as explained above.

Although the arrangements shown in FIGS. 1 to 4 relate to a series motor, they can also be applied to shunt and compound motors. In this case, the arrangements described will control the armature current.

Referring now to FIG. 5, in addition to the traction battery 13, the vehicle includes a battery 40, typically at 24 volts, having its positive terminal connected to a supply line 32 and its negative terminal connected to a line 31. The selector switch previously mentioned is shown at 33 and has a central off position, together with forward and reverse positions. In the forward position illustrated the switch 33 completes a circuit between the lines 32, 31 through a relay winding 34, and in the reverse position the switch 33 completes a circuit between the lines 32, 31 by way of a relay winding 35. The windings 34 and 35 serve when energised to close contacts 34a and 35a respectively, and various control and safety arrangements may be provided between the windings 34, 35 and contact 34a, 35a. However, for the purposes of the present example it can be assumed that energisation of the one of the windings 34, 35 ultimately closes the appropriate contact 34a, 35a.

Connected in series between the lines 32, 31 are a relay winding 36, a contact B2, a switch 38 and the contact 34a. The winding 36 when energised closes two contacts 36a and 36b. The contact 36a is connected in series with the device F between the lines 32, 31, and the contact 36b is connected in series with a switch 41 between the junction of the winding 36 and switch 37a, and the line 31. A further series circuit is connected between the lines 32, 31 and includes a relay winding 42, a switch 43, a contact F2, a switch 44 and the contacts 34a. The winding 42 serves when energised to close contacts 42a and 42b. The contact 42a is connected in series with the device B between the lines 32, 31, and the contact 42b connects the junction of the winding 42 and switch 43 to the junction of the contact 36b and switch 41. Moreover, the device R is connected in series with the contact 35a between the lines 32, 31.

The contact B2 is a normally closed contact which is opened when the device B is energised. Similarly, the contact F2 is a normally closed contact which is opened when the device F is energised. The switches 38 and 44 are operated by the accelerator and brake pedals of the vehicle respectively, and are closed when the accelerator and brake pedals are depressed. The switch 43 is a speed-sensitive switch operable by the vehicle, and closes only when the speed of the vehicle is in excess of the predetermined low value, typically 4 m.p.h. The switch 41 is a current-sensitive switch operable by the device 18 shown in FIGS. 1 to 4, and is closed whenever the current flowing through the motor armature is above a predetermined low value, typically 30 amps.

In operation, assume for the moment that the reverse position of the switch 33 is chosen so that the winding 35 is energised. The contact 35a closes to energise the device R, so that the circuit shown in FIG. 2 is obtained.

Assume now that the forward position of the switch 33 is chosen, so that the winding 34 is energized. The contact 34a is closed, and it will be assumed that the accelerator pedal of the vehicle is depressed. The switch 38 is closed by the accelerator pedal, and since the device B is not energised the contact B2 is closed and the winding 36 is energised, so that the contact 36a closes to energise the device F and operate the contactors so that the circuit has the form shown in FIG. 1. Operation of the device F opens the contact F2, so that the winding 42 cannot be energised. As long as the device F is energised, depression of the brake pedal will have no effect so far as electrical braking is concerned, although of course it will still provide normal hydraulic braking.

If the accelerator pedal is released so that the switch 38 opens, the winding 36 remains energised by way of the contact 36b and the switch 41 until the motor current falls below 30 amps. Only at this point does the winding 36 become de-energised, so that the contacts 36a and 36b open and the device F is de-energised.

Once the device F has been de-energised, the contact F2 closes, and if the brake pedal is depressed the winding 42 will be energised if the switch 43 is closed, (i.e.) if the vehicle speed is in excess of 4 m.p.h. Energisation of the winding 42 closes the contacts 42a and 42b so that the device B is energised to open the contact B2 and prevent operation of the device F. The winding 42 will remain energised by way of the switch 41, even if the switch 44 opens, until the motor current is below 30 amps.

The purpose of the switch 43 is to ensure that if the brake pedal and accelerator pedal are depressed simultaneously at low speeds, electrical braking will not be obtained, and the accelerator pedal still controls the device F. The switch 41 is particularly useful where the switch 43 is employed, because it ensures that if electrical braking is being obtained, the electrical braking does not suddenly disappear below 4 m.p.h. when the switch 43 opens. The arrangement shown also has the advantage that if during forward movement of the vehicle the driver rest his foot lightly on the brake pedal, the subsequent closing of the switch 44 will have no effect on the circuit because the contact F2 is open.

In a modification of the example described, the contact B2 and F2 are included in series with the devices F and B respectively. Using this arrangement, it is possible to energise both windings 36 and 42 at the same time, but one of the windings will have no effect, because one of the contacts B2 or F2 will be open.

Referring for the moment to FIG. 1, it will be recalled that when the current flowing in the device 18 reaches an upper level, the thyristor 22 is fired, and when the current then falls to a lower level, the thyristor 19 is fired, the thyristor 24 being fired at the same time. It is essential for the thyristors in the chopper circuit to be fired in the correct sequence, and when the circuit is being switched from its forward condition to its electrical braking condition, a problem can arise. Thus, consider the situation where a vehicle is travelling in a forward direction with the accelerator pedal depressed. The chopper circuit is operating in the manner described, and if the driver now wishes to brake the vehicle, he will first remove his foot from the accelerator pedal. This will reduce the demand substantially, so that inevitably the armature current will be above the demanded level and the thyristor 22 will be fired to turn off the thyristor 19, and leave the chopper circuit with the capacitor 23 charged. If now at a later time the brake pedal is depressed, contactor B operates, the demanded current is increased, and the armature current will be below the demanded current. The thyristor 19 will now be fired, and the circuit will continue to operate satisfactorily. However, it is quite possible that during the braking operation, the driver will press the brake pedal at the same time as the accelerator pedal is released. This can lead to a condition where the device 26 attempts to switch the chopper "on" although at the time the motor contactors have disconnected the chopper from the motor and the supply lines. In these circumstances the chopper circuit will cease to operate since no other switch "on" pulse is produced even though the chopper circuit is subsequently completed.

In order to overcome this problem, means is provided for ensuring that when one of the two pedals is released and the other is depressed, the demand is reduced to zero, for a predetermined period of time irrespective of the position of the pedals. The demand remains zero until the contactors have changed over. Preferably, the demand is then increased gradually to the level set by the pedal in use. An arrangement for achieving this is shown in FIG. 6.

Referring to FIG. 6, connected in series between the lines 32, 31 are a pair of resistors 51, 52. A slider moves over the resistor 52, and is controlled by the accelerator pedal of the vehicle as previously explained. The slider is connected through a resistor 53 and a diode 54 in series to the unit 26, so that when the accelerator pedal of the vehicle is depressed, a current flows through the resistor 53 and diode 54 to the unit 26 to set the mode of speed in the manner previously described. Moreover, connected in parallel between the junction of the resistor 53 and diode 54 and the line 31 are three circuits containing respectively a contact 56 a contact 38a and a capacitor 55. The contact 38a opens when the accelerator pedal is depressed, and the contact 56 is controlled by a device 58 which is connected to the line 32 through a contact F3 operable by the device F. The device 58 operates the contact 56 only after a delay controlled by a delay circuit 57.

A similar set of components are connected between the lines 32, 31 and are associated with the brake pedal of the vehicle. These components are indicated by the same reference numerals with the suffix a. Thus, when the brake pedal of the vehicle is depressed, a slider moves over a resistor 52a, and provides a signal by way of a diode 54a to the unit 26. The unit 26 will set the motor speed in accordance with the current flowing either through the diode 54a or the diode 54. The contactor 44a connected between the junction of the diode 54a and resistor 53a and the line 31 replaces the equivalent contact 38a previously described, and the device 58a is connected to the line 32 through a contact B3 operable by the device B.

In order to understand the operation of the arrangement shown in FIG. 6, assume that the vehicle is travelling forwards with the accelerator pedal depressed. At this stage the contacts 38a and 56 will be open, the capacitor 55 charged, and current will be flowing through the diode 54 to the unit 26 to control the speed of the motor. The brake pedal is not depressed, and so the contact 44a is closed, as is the contact 56a, so that the capacitor 55a is not charged and no current flows through the diode 54a.

Suppose now that electrical braking is required, so that the driver lifts his foot from the accelerator pedal, and depresses the brake pedal. Since the accelerator pedal is not depressed, the contact 38a closes to discharge the capacitor 55. Since the contact 38a is closed, no current now flows to the unit 26 through the diode 54, and since there is no current flow through the diode 54a either, the demanded current falls to zero.

As soon as the device F is de-energised, the contact F3 opens, and contact 56 then closes.

Although the brake pedal of the vehicle has now been depressed to open the contact 44a, the contact 56a is still closed and so the capacitor 55a is still discharged. However, when the device B is energised the contact B3 closes, and after a delay determined by the device 57a the contact 56a opens. When the contact 56a opens, the capacitor 55a starts to charge, and so the demanded current increases expotentially until the capacitor 55a is fully charged, at which point the demanded current is that set by the brake pedal. Thus, there is a delay period during which the current demand is zero, and then following operation of the contactors the current then rises exponentially to the level actually demanded by the brake pedal. As previously explained, this arrangement ensures that the thyristors will be fired in the correct sequence.

When the brake pedal is released and the accelerator pedal is depressed, the sequence of operations is exactly the same, the contact 56 remaining closed until the contactors have operated and the delay controlled by device 57 has expired.

Figure 7:
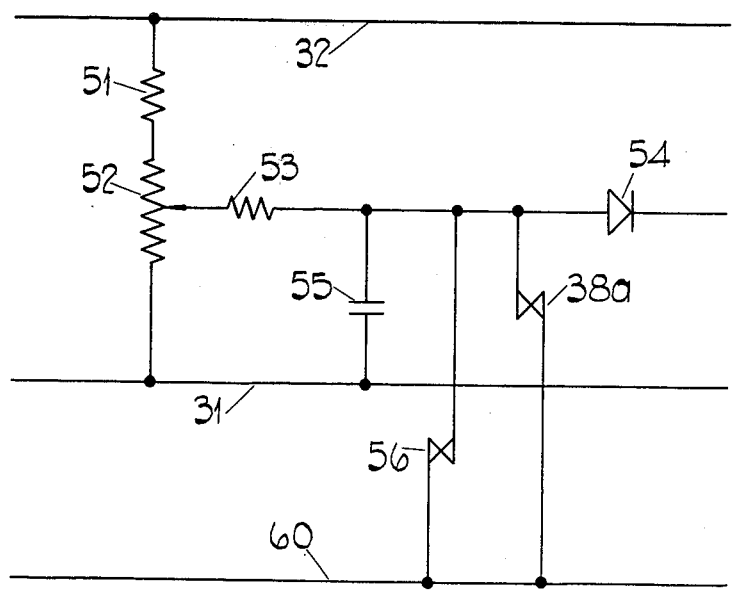

FIG. 7 shows a modiciation in which the capacitor 55 provides the required delay, so that the components 57, 58 and their equivalent 57a, 58a, are no longer required, 56 and 56a are now operated directly by devices F and B. In this arrangement, there is a negative supply line 60, and the contacts 56 and 38a are returned to the line 60, although the capacitor 55 is still returned to thee line 31. When one of the contacts 56, 38a is closed, the capacitor 55 can charge negatively. When both the contacts 56 and 38a are open, the capacitor 55 must first discharge, and then charge again as in FIG. 6. The discharge provides the required delay. The circuit operates in the same way in relation to the capacitor 55a.

I claim:

1. A control circuit for an electrically driven vehicle, comprising in combination a traction motor for driving the vehicle, an accelerator pedal which when depressed provides electrical drive and also determines the current in the motor armature, a brake pedal which when depressed provides electrical braking and also determines the current in the motor armature, contactors for selectively effecting said motor's armature-field connection, a thyristor chopper circuit controlling the operation of the motor, said chopper circuit including a main thyristor in series with the motor, a commutating capacitor for turning the main thyristor off, and a commutating thyristor controlling the commutating capacitor, a control unit which receives a signal representing the actual armature current and a signal from one of said pedals representing demanded armature current, the control unit providing gating pulses to the thyristors, in sequence in accordance with the actual and demanded current signals so as to control the armature current, and control means operable whenever the motor is switched from its forward drive to its forward braking condition and vice versa for reducing the demand signal fed to said control unit to a low value during changeover of said contactors effecting motor armature-field connection, and maintaining said demand signal at said low value for a predetermined time period initiated by said contactors closing to prevent incorrect firing of the thyristors due to contactor bounce.

2. A circuit as claimed in claim 1 in which the control means reduces the demand signal to zero for the set period and then permits the demand signal to rise gradually to the level set by the accelerator or brake pedal.

* * * * *